United States Patent [19]
Behringer et al.

[11] Patent Number: 5,531,075
[45] Date of Patent: Jul. 2, 1996

[54] PROCESS TO TRANSPORT ACETYLENE

[75] Inventors: Hartmut Behringer, Erstadt; Siegfried Pottkämper; Hans-Werner Stephan, both of Hurth; Gerrit Marcks, Berlin, all of Germany

[73] Assignee: Messer Griesheim GmbH, Germany

[21] Appl. No.: 358,247

[22] Filed: Dec. 19, 1994

[30] Foreign Application Priority Data

Dec. 21, 1993 [DE] Germany .......................... 43 43 659.5

[51] Int. Cl.[6] .................................................. F17C 11/00
[52] U.S. Cl. .......................... 62/46.1; 220/216; 220/901
[58] Field of Search .............................. 62/46.1; 220/216, 220/218, 901

[56] References Cited

U.S. PATENT DOCUMENTS

| | | | |
|---|---|---|---|
| 3,574,276 | 4/1971 | Strelzoff | 62/46.1 |
| 3,687,329 | 8/1972 | Baum | 220/216 |
| 3,861,160 | 1/1975 | Walker | 62/46.1 |

Primary Examiner—Ronald C. Capossela
Attorney, Agent, or Firm—Connolly & Hutz

[57] ABSTRACT

In a process to transport acetylene which is dissolved in a solvent in a pressurized, insulated tank, the acetylene-to-solvent mass ratio of the solution is 0.30 at the maximum, whereby the solution has a temperature of up to −55° C. [−67° F.]. The surface of the solution in the tank is covered by a multilayer configuration consisting of pieces of floating material.

19 Claims, 1 Drawing Sheet

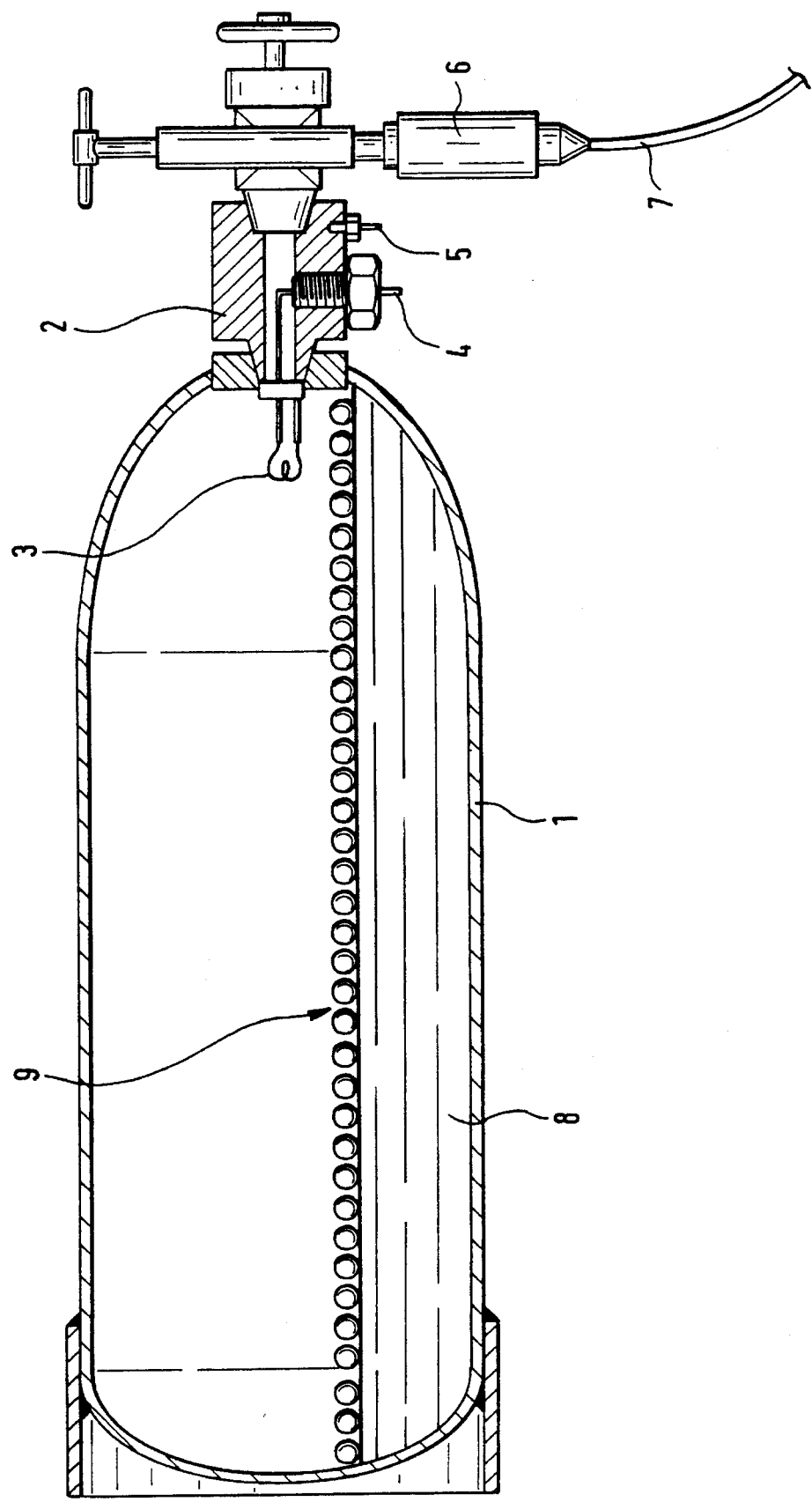

PROCESS TO TRANSPORT ACETYLENE

BACKGROUND OF INVENTION

The present invention relates to a process to transport acetylene in a pressurized, insulated tank whereby the acetylene is dissolved in a solvent.

U.S. Pat. No. 2,925,385 describes a process to safely handle and store acetylene as well as to safely transport it. According to this process, gaseous acetylene is placed at temperatures below −80° C. [−112° F.] into a mixture consisting of liquids which are capable of rapidly dissolving acetylene and the resulting solution is kept, for example, at a temperature below −76° C. [−104.8° F.] at atmospheric pressure.

Finally, German Preliminary Published Application No. 34 42 014 discloses that dimethyl formamide is employed as a solvent for acetylene in order to suppress its tendency to disintegrate.

Disadvantageous aspects of the known processes are that, in order to receive the gaseous acetylene, the solvent has to be cooled down to very low temperatures and also that the storage temperature at atmospheric pressure has to be at least −78° F. [−108.4° F.].

SUMMARY OF THE INVENTION

Therefore, the present invention has the objective of proposing a process to safely transport acetylene dissolved in a solvent, a process in which the cooling requirements are considerably less. This is achieved according to the invention in that the acetylene-to-solvent mass ratio of the solution is 0.30 at the maximum, in that the solution has a temperature of up to −55° C. [−67° F.] and in that the surface of the solution in the tank is covered by a multilayer configuration consisting of pieces of floating material.

Optionally, the process according to the invention can also be characterized in that:
   a) the surface of the solution is covered by a three-layer configuration consisting of pieces of floating material;
   b) none of the dimensions of the pieces of floating material is greater than 30 mm;
   c) the pieces are spheres, preferably hollow spheres;
   d) the spheres have a diameter ranging from 15 mm to 25 mm;
   e) the spheres are made of plastic;
   f) polypropylene is used as the plastic;
   g) the spheres are made of metal;
   h) aluminum is used as the metal;
   i) due to the introduction of a gas, the gas pressure in the tank is greater than the atmospheric pressure, whereby the gas is essentially insoluble in the solvent for acetylene and whereby the acetylene partial pressure above the solution is not greater than 0.8 bar immediately after the tank has been filled;
   j) the acetylene partial pressure above the solution rises to a maximum of 1.1 bar in the operating state.

With the process according to the invention, tanks should be used whose test pressure is relatively high in comparison to the operating pressure. Thus, for example, tanks having a test pressure ranging from 25 bar to 30 bar are recommended if the acetylene partial pressure above the solution is about 1 bar during operation.

In the process according to the invention, it is possible to use inert gases such as, for instance, nitrogen or rare gases, or else flammable gases such as, for example hydrogen or carbon monoxide, as the gases which are practically insoluble in the solvent in which the acetylene is dissolved.

In the process according to the invention, the insulation of the tanks is to be carried out in such a manner that the rate at which the temperature rises in the filled tank does not exceed 0.15 K./h under normal operation.

BRIEF DESCRIPTION OF DRAWING

The drawing depicts an apparatus by means of which it is possible to conduct explosion tests according to the following examples.

DETAILED DESCRIPTION

In a steel cylinder 1 positioned horizontally (test pressure: 60 bar), instead of the conventional closing valve, there is a screwed-in ignition valve 2 which has an ignition coil 3 made of nickel wire and located inside the steel cylinder 1. The ignition coil 3 can be electrically connected to a source of alternating current by means of lines (4,5). In the ignition valve 2, on the end located outside of the steel cylinder 1, there is an electric pressure pick-up 6 whose connecting line 7 leads to a line recorder. In the steel cylinder 1, there is a solution 8 consisting of acetylene in dimethyl formamide on whose surface there is at least one layer made up of floating spheres 9.

EXAMPLE

Steel cylinders 1 (see the drawings) having a useful volume of 5.2 and 20.9 liters were employed.

Prior to being filled, the steel cylinders 1 were evacuated and then the solvent dimethyl formamide was drawn in. After renewed pumping off, the acetylene was introduced while being shaken, whereby the amount filled in each case was determined by means of weighing the volume proportion of the solution 8 in the steel cylinders 1 ranged between 25% and 48%. Floating spheres 9 made of polypropylene (diameter: 20 mm) were applied either in one layer or in three layers onto the surface of the solution 8.

In order to set the pressure in the steel cylinders 1 at a value at which ignition was to be carried out by means of the glowing ignition coil 3, the cylinders were kept either in ice water or in an acetone bath cooled with liquid nitrogen or with solid carbon dioxide until the pressure had fallen below the prescribed value. After removing the steel cylinders 1 from the cooling bath, ignition was carried out once the pre-selected pressure had been reached.

The results are compiled in the Table.

| Experiment | A | B | C | D |
|---|---|---|---|---|
| $m_A/m_L$ | 0.257 | 0.257 | 0.257 | 0.257 |
| V [liters] | 20.9 | 5.2 | 20.9 | 20.9 |
| S | 3 | 1 | 1 | 3 |
| $P_0$ [bar] | 1.50 | 1.25 | 1.26 | 1.08 |
| $P_1$ [bar] | 15.4 | 10.6 | 14.0 | 10.1 |
| $P_2$ [bar] | — | 41.0 | 51.7 | — |

Line 1 shows the mass ratio of acetylene to dimethyl formamide, line 2 shows the exact volume of the steel cylinders 1 employed, line 3 contains the number of layers of spheres on the solution 8 and line 4 indicates the pressure prior to ignition. Finally, lines 4 and 6 list the 1st and 2nd pressure maxima.

In Experiments B and C, approximately 3 seconds after ignition, the pressure-time diagram showed a first pressure maximum which was lower than the second pressure maximum which was reached approximately 1 minute after ignition.

A noteworthy aspect is that, with three layers of polypropylene spheres on the surface of solution 8, no second pressure maximum occurs (see Experiments A and D).

What is claimed is:

1. In a process to transport acetylene in a pressurized, insulated tank whereby the acetylene is dissolved in a solvent, the improvement being in dissolving the acetylene in the solvent to obtain a solution having a maximum mass ratio of 0.30 acetylene-to-solvent at a temperature of up to −55° C., and covering the surface of the solution in the tank by a multilayer configuration consisting of pieces of floating material.

2. Process according to claim 1, characterized in covering the surface of the solution with a three-layer configuration consisting of pieces of floating material.

3. Process according to claim 2, characterized in providing the pieces of floating material of a minimum dimension of 30 mm.

4. Process according to claim 3, characterized in providing the pieces in the form of spheres.

5. Process according to claim 4, characterized in providing the spheres as hollow spheres.

6. Process according to claim 4, characterized in providing spheres which have a diameter ranging from 15 mm to 25 mm.

7. Process according to claim 6, characterized in providing spheres made of metal.

8. Process according to claim 7, characterized in introducing a gas into the tank, pressurizing the tank to create a gas pressure in the tank greater than the atmospheric pressure so that the gas is essentially insoluble in the solvent for acetylene and the acetylene partial pressure above the solution is not greater than 0.8 bar immediately after the tank has been filled.

9. Process according to claim 6, characterized in providing spheres which are made of plastic.

10. Process according to claim 9, characterized in providing spheres made of polypropylene.

11. Process according to claim 10, characterized in providing spheres made of aluminum.

12. Process according to claim 10, characterized in raising the acetylene partial pressure above the solution to a maximum of 1.1 bar in the operating state.

13. Process according to claim 4, characterized in providing spheres made of plastic.

14. Process according to claim 1, characterized in providing pieces of floating material of a maximum dimension of 30 mm.

15. Process according to claim 1, characterized in providing the pieces in the form of spheres.

16. Process according to claim 15, characterized in providing the spheres as hollow spheres.

17. Process according to claim 1, characterized in providing spheres made of metal.

18. Process according to claim 1, characterized in introducing a gas into the tank, pressurizing the tank to create a gas pressure in the tank greater than the atmospheric pressure so that the gas is essentially insoluble in the solvent for acetylene and the acetylene partial pressure above the solution is not greater than 0.8 bar immediately after the tank has been filled.

19. Process according to claim 1, characterized in raising the acetylene partial pressure above the solution to a maximum of 1.1 bar in the operating state.

* * * * *